United States Patent
Wong et al.

(10) Patent No.: US 9,056,754 B2
(45) Date of Patent: Jun. 16, 2015

(54) METHOD AND APPARATUS FOR USING PRE-POSITIONED OBJECTS TO LOCALIZE AN INDUSTRIAL VEHICLE

(71) Applicant: Crown Equipment Limited, Tamaki (NZ)

(72) Inventors: Lisa Wong, Auckland (NZ); Andrew Evan Graham, Waitakere (NZ); Christopher W. Goode, Aukland (NZ); Lucas B. Waltz, Coldwater, OH (US)

(73) Assignee: Crown Equipment Limited, Tamaki, Auckland (NZ)

( * ) Notice: Subject to any disclaimer, the term of this patent is extended or adjusted under 35 U.S.C. 154(b) by 0 days.

(21) Appl. No.: 13/672,391

(22) Filed: Nov. 8, 2012

(65) Prior Publication Data
US 2014/0074342 A1   Mar. 13, 2014

Related U.S. Application Data

(63) Continuation of application No. PCT/US2012/054062, filed on Sep. 7, 2012, which is a continuation of application No. 13/227,165, filed on Sep. 7, 2011, now abandoned.

(51) Int. Cl.
*G05D 1/00* (2006.01)
*B66F 9/075* (2006.01)
*G05D 1/02* (2006.01)

(52) U.S. Cl.
CPC .............. *B66F 9/0755* (2013.01); *G05D 1/021* (2013.01); *G05D 1/0274* (2013.01); *G05D 2201/0216* (2013.01)

(58) Field of Classification Search
CPC ................. G05D 2201/0216; G05D 1/0234; G05D 1/0274; G05D 1/0246; G05D 1/024; G01S 5/16; G01S 5/163; G01S 17/06; G01S 17/48; G01S 13/74; G01C 21/16; G01C 21/165; G01C 21/206; G01C 21/26

USPC ........... 701/28, 23, 434, 2, 25, 408, 457, 500; 340/995.2, 10.1, 10.6, 572.1, 901, 988, 340/990; 700/253, 56, 214, 215, 225
See application file for complete search history.

(56) References Cited

U.S. PATENT DOCUMENTS 4,043,418 A   8/1977   Blakeslee
4,071,740 A   1/1978   Gogulski
(Continued)

FOREIGN PATENT DOCUMENTS

DE   19757333 C1   9/1999
DE   10220936 A1   12/2003
(Continued)

OTHER PUBLICATIONS

Office Action from U.S. Appl. No. 13/159,501 mailed Jan. 10, 2013.
(Continued)

*Primary Examiner* — John R Olszewski
*Assistant Examiner* — Truc M Do
(74) *Attorney, Agent, or Firm* — Dinsmore & Shohl LLP

(57) ABSTRACT

According to one embodiment of the present disclosure, a method of using dynamically placed pre-positioned objects as landmarks to operate an industrial vehicle is provided. The method comprises (i) transporting an object along a path within the physical environment and placing the object at a location within the physical environment such that the placed object becomes a dynamically placed pre-positioned object in the physical environment; (ii) updating a map of the physical environment by adding placed object data representing the dynamically placed pre-positioned object to the map of the physical environment to create updated map data such that the placed object, when added to the map, serves as a landmark with observable features and can be used in the navigation of an industrial vehicle with access to the updated map data; (iii) storing the updated map data on a mobile computer attached to the industrial vehicle or on a central computer coupled to the industrial vehicle via a network; and (iv) operating the industrial vehicle based on a navigational position determined from sensor data and the updated map data by navigating the industrial vehicle along a path within the physical environment.

19 Claims, 6 Drawing Sheets

(56) References Cited

U.S. PATENT DOCUMENTS

| | | |
|---|---|---|
| 4,530,056 A | 7/1985 | MacKinnon et al. |
| 4,782,920 A | 11/1988 | Gaibler et al. |
| 4,855,915 A | 8/1989 | Dallaire |
| 4,858,132 A | 8/1989 | Holmquist |
| 4,996,468 A | 2/1991 | Field et al. |
| 5,011,358 A | 4/1991 | Andersen et al. |
| 5,051,906 A | 9/1991 | Evans, Jr. et al. |
| 5,170,352 A | 12/1992 | McTamaney et al. |
| 5,202,832 A | 4/1993 | Lisy |
| 5,208,753 A | 5/1993 | Acuff |
| 5,283,739 A | 2/1994 | Summerville et al. |
| 5,471,393 A | 11/1995 | Bolger |
| 5,491,670 A | 2/1996 | Weber |
| 5,539,638 A | 7/1996 | Keeler et al. |
| 5,568,030 A | 10/1996 | Nishikawa et al. |
| 5,586,620 A | 12/1996 | Dammeyer et al. |
| 5,612,883 A | 3/1997 | Shaffer et al. |
| 5,646,845 A | 7/1997 | Gudat et al. |
| 5,682,317 A | 10/1997 | Keeler et al. |
| 5,911,767 A | 6/1999 | Garibotto et al. |
| 5,916,285 A | 6/1999 | Alofs et al. |
| 5,938,710 A | 8/1999 | Lanza et al. |
| 5,941,935 A | 8/1999 | Fernandez |
| 5,961,571 A | 10/1999 | Gorr et al. |
| 6,012,003 A | 1/2000 | Astrom |
| 6,092,010 A | 7/2000 | Alofs et al. |
| 6,122,572 A | 9/2000 | Yavnai |
| 6,208,916 B1 | 3/2001 | Hori |
| 6,246,930 B1 | 6/2001 | Hori |
| 6,269,291 B1 | 7/2001 | Segeren |
| 6,285,951 B1 | 9/2001 | Gaskins et al. |
| 6,295,503 B1 | 9/2001 | Inoue et al. |
| 6,308,118 B1 | 10/2001 | Holmquist |
| 6,325,749 B1 | 12/2001 | Inokuchi et al. |
| 6,461,355 B2 | 10/2002 | Svejkovsky et al. |
| 6,470,300 B1 | 10/2002 | Benzinger et al. |
| 6,493,614 B1 | 12/2002 | Jung |
| 6,539,294 B1 | 3/2003 | Kageyama |
| 6,592,488 B2 | 7/2003 | Gassmann |
| 6,641,355 B1 | 11/2003 | McInerney et al. |
| 6,816,085 B1 | 11/2004 | Haynes et al. |
| 6,842,692 B2 | 1/2005 | Fehr et al. |
| 6,917,839 B2 | 7/2005 | Bickford |
| 6,922,632 B2 | 7/2005 | Foxlin |
| 6,934,615 B2 | 8/2005 | Flann et al. |
| 6,952,488 B2 | 10/2005 | Kelly et al. |
| 7,015,831 B2 | 3/2006 | Karlsson et al. |
| 7,076,336 B2 | 7/2006 | Murray, IV et al. |
| 7,147,147 B1 | 12/2006 | Enright et al. |
| 7,148,458 B2 | 12/2006 | Schell et al. |
| 7,162,056 B2 | 1/2007 | Burl et al. |
| 7,162,338 B2 | 1/2007 | Goncalves et al. |
| 7,177,737 B2 | 2/2007 | Karlsson et al. |
| 7,246,007 B2 | 7/2007 | Ferman |
| 7,272,467 B2 | 9/2007 | Goncalves et al. |
| 7,305,287 B2 | 12/2007 | Park |
| 7,343,232 B2 | 3/2008 | Duggan et al. |
| 7,386,163 B2 | 6/2008 | Sabe et al. |
| 7,451,021 B2 | 11/2008 | Wilson |
| 7,451,030 B2 | 11/2008 | Eglington et al. |
| 7,499,796 B2 | 3/2009 | Listle et al. |
| 7,539,563 B2 | 5/2009 | Yang et al. |
| 7,610,123 B2 | 10/2009 | Han et al. |
| 7,646,336 B2 | 1/2010 | Tan et al. |
| 7,650,231 B2 | 1/2010 | Gadler |
| 7,679,532 B2 | 3/2010 | Karlsson et al. |
| 7,688,225 B1 | 3/2010 | Haynes et al. |
| 7,689,321 B2 | 3/2010 | Karlsson |
| 7,720,554 B2 | 5/2010 | DiBernardo et al. |
| 7,734,385 B2 | 6/2010 | Yang et al. |
| 7,739,006 B2 | 6/2010 | Gillula |
| 7,844,364 B2 | 11/2010 | McLurkin et al. |
| 7,996,097 B2 | 8/2011 | DiBernardo et al. |
| 8,020,657 B2 | 9/2011 | Allard et al. |
| 8,050,863 B2 | 11/2011 | Trepagnier et al. |
| 8,103,383 B2 | 1/2012 | Nakamura |
| 8,126,642 B2 | 2/2012 | Trepagnier et al. |
| 8,150,650 B2 | 4/2012 | Goncalves et al. |
| 8,204,679 B2 | 6/2012 | Nakamura |
| 8,255,107 B2 | 8/2012 | Yang et al. |
| 8,271,069 B2 | 9/2012 | Jascob et al. |
| 8,280,623 B2 | 10/2012 | Trepagnier et al. |
| 8,296,065 B2 | 10/2012 | Haynie et al. |
| 8,538,577 B2 * | 9/2013 | Bell et al. ........ 700/215 |
| 2002/0049530 A1 | 4/2002 | Poropat |
| 2004/0030493 A1 | 2/2004 | Pechatnikov et al. |
| 2004/0202351 A1 | 10/2004 | Park et al. |
| 2004/0249504 A1 | 12/2004 | Gutmann et al. |
| 2005/0075116 A1 | 4/2005 | Laird et al. |
| 2005/0080524 A1 | 4/2005 | Park |
| 2005/0140524 A1 | 6/2005 | Kato et al. |
| 2005/0149256 A1 * | 7/2005 | Lawitzky et al. ........ 701/207 |
| 2005/0182518 A1 | 8/2005 | Karlsson |
| 2005/0234679 A1 | 10/2005 | Karlsson |
| 2005/0244259 A1 | 11/2005 | Chilson et al. |
| 2005/0246078 A1 | 11/2005 | Vercammen |
| 2006/0181391 A1 | 8/2006 | McNeill et al. |
| 2006/0184013 A1 | 8/2006 | Emanuel et al. |
| 2007/0027612 A1 | 2/2007 | Barfoot et al. |
| 2007/0050088 A1 | 3/2007 | Murray, IV et al. |
| 2007/0061043 A1 | 3/2007 | Ermakov et al. |
| 2007/0090973 A1 | 4/2007 | Karlsson et al. |
| 2007/0106465 A1 | 5/2007 | Adam et al. |
| 2007/0150097 A1 | 6/2007 | Chae et al. |
| 2007/0153802 A1 | 7/2007 | Anke et al. |
| 2007/0213869 A1 | 9/2007 | Bandringa et al. |
| 2007/0244640 A1 | 10/2007 | Hirokawa |
| 2007/0262884 A1 | 11/2007 | Goncalves et al. |
| 2008/0015772 A1 | 1/2008 | Sanma et al. |
| 2008/0046170 A1 | 2/2008 | DeGrazia |
| 2008/0167817 A1 | 7/2008 | Hessler et al. |
| 2008/0199298 A1 | 8/2008 | Chilson et al. |
| 2008/0272193 A1 | 11/2008 | Silverbrook et al. |
| 2009/0005986 A1 | 1/2009 | Soehren |
| 2009/0012667 A1 | 1/2009 | Matsumoto et al. |
| 2009/0140887 A1 | 6/2009 | Breed et al. |
| 2009/0198371 A1 * | 8/2009 | Emanuel et al. ........ 700/226 |
| 2009/0216438 A1 | 8/2009 | Shafer |
| 2009/0306946 A1 | 12/2009 | Badler et al. |
| 2010/0021272 A1 * | 1/2010 | Ward et al. ........ 414/137.1 |
| 2010/0023257 A1 | 1/2010 | Machino |
| 2010/0161224 A1 | 6/2010 | Lee et al. |
| 2010/0222925 A1 | 9/2010 | Anezaki |
| 2010/0256908 A1 | 10/2010 | Shimshoni et al. |
| 2010/0268697 A1 | 10/2010 | Karlsson et al. |
| 2010/0286905 A1 | 11/2010 | Goncalves et al. |
| 2010/0286909 A1 | 11/2010 | Tate, Jr. et al. |
| 2011/0010023 A1 | 1/2011 | Kunzig et al. |
| 2011/0085426 A1 | 4/2011 | Kwon et al. |
| 2011/0121068 A1 | 5/2011 | Emanuel et al. |
| 2011/0125323 A1 | 5/2011 | Gutmann et al. |
| 2011/0148714 A1 | 6/2011 | Schantz et al. |
| 2011/0150348 A1 | 6/2011 | Anderson |
| 2011/0153338 A1 * | 6/2011 | Anderson ........ 705/1.1 |
| 2011/0216185 A1 | 9/2011 | Laws et al. |
| 2011/0218670 A1 | 9/2011 | Bell et al. |
| 2011/0230207 A1 | 9/2011 | Hasegawa |
| 2012/0035797 A1 | 2/2012 | Oobayashi et al. |
| 2012/0101784 A1 | 4/2012 | Lindores et al. |
| 2012/0191272 A1 * | 7/2012 | Andersen et al. ........ 701/2 |
| 2012/0287280 A1 | 11/2012 | Essati et al. |
| 2012/0323431 A1 | 12/2012 | Wong et al. |
| 2013/0006420 A1 | 1/2013 | Karlsson et al. |
| 2013/0101230 A1 * | 4/2013 | Holeva et al. ........ 382/202 |
| 2013/0275045 A1 * | 10/2013 | Tsujimoto et al. ........ 701/517 |

FOREIGN PATENT DOCUMENTS

| | | |
|---|---|---|
| DE | 10234730 A1 | 2/2004 |
| DE | 10 2007 021 693 | 11/2008 |
| DE | 102007021693 A1 | 11/2008 |
| EP | 0508793 A2 | 10/1992 |
| EP | 1 201 536 A2 | 5/2002 |
| EP | 1732247 A1 | 12/2006 |

(56) References Cited

FOREIGN PATENT DOCUMENTS

| | | |
|---|---|---|
| EP | 1 995 206 A1 | 11/2008 |
| GB | 2389947 A | 12/2003 |
| JP | 52-066260 | 1/1977 |
| JP | 60067818 A | 4/1985 |
| JP | 2000255716 B1 | 9/2000 |
| JP | 2002048579 A | 2/2002 |
| JP | 2002108446 A | 4/2002 |
| JP | 2005114546 A | 4/2005 |
| KR | 10-0814456 B3 | 3/2008 |
| WO | 02083546 A1 | 10/2002 |
| WO | 03042916 A1 | 5/2003 |
| WO | 03/096052 A1 | 11/2003 |
| WO | 2004015510 A1 | 2/2004 |
| WO | 2005068272 A2 | 7/2005 |
| WO | 2011044298 A2 | 4/2011 |
| WO | 2011085426 A1 | 7/2011 |
| WO | 2012166970 A1 | 12/2012 |

OTHER PUBLICATIONS

Office Action from U.S. Appl. No. 12/660,616 mailed Nov. 27, 2012.
"Three Engineers, Hundreds of Robots, One Warehouse," Guizzo, IEEE Spectrum, Jul. 2008.
Office Action from U.S. Appl. No. 13/116,600 mailed Dec. 31, 2012.
Search Report/Written Opinion from PCT/NZ2012/000051 mailed Jan. 2, 2013.
Search Report/Written Opinion from PCT/NZ2012/000091 mailed Oct. 31, 2012.
Search Report/Written Opinion from PCT/US2012/052247 mailed Nov. 27, 2012.
Office Action mailed May 8, 2013 from U.S. Appl. No. 13/672,260, filed Nov. 8, 2012.
Office Action mailed Jun. 4, 2013 from U.S. Appl. No. 13/159,501, filed Jun. 14, 2011.
Office Action mailed May 21, 2013 from U.S. Appl. No. 12/718,620, filed Mar. 5, 2010.
Office Action mailed Jul. 12, 2013 from U.S. Appl. No. 13/227,165, filed Sep. 7, 2011.
Office Action pertaining to U.S. Appl. No. 13/300,041 dated Sep. 19, 2013.
Borenstein et al. "Mobile Robot Positioning—Sensors and Techniques", Journal of Robotic Systems, Special Issue on Mobile Robots, vol. 14, No. 4, pp. 231-249, Apr. 1997.
Harmon et al., "A Technique for Coordinating Autonomous Robots", Autonomous Systems Branch Naval Ocean Systems Center San Diego, CA 92152, 1986.
Jansfelt et al., "Laser Based Position Acquisition and Tracking in an Indoor Environment", Proc. Int. Symp. Robotics and Automation, 1998.
Siadat et al., "An Optimized Segmentation Method for a 2D Laser-Scanner Applied to Mobile Robot Navigation", Proceedings of the 3rd IFAC Sympo9sium on Intelligent Components and Instruments for Control Applications, 1997.
Office Action pertaining to U.S. Appl. No. 131159,500, dated Mar. 26, 2013.
Office Action pertaining to U.S. Appl. No. 13/219,271, dated Feb. 25, 2013.
Office Action pertaining to U.S. Appl. No. 13/153,743, dated Mar. 4, 2013.
International Search Report and Written Opinion pertaining to International Patent Application No. PCT/NZ2012/000084, dated Jan. 30, 2013.
Office Action from U.S. Appl. No. 12/948,358 mailed Apr. 8, 2013.
Korean Preliminary Rejection dated Aug. 29, 2014 pertaining to the Korean Application No. 10-2014-7000140 (with English translation).
Communication pursuant to Rules 161(1) and 162 EPC dated Apr. 17, 2014 pertaining to European Application No. 12773426.7.
Korean Notice of Preliminary Rejection dated May 1, 2014, for Korean Application No. 10-2014-7000894.
Australian Examination Report dated Jun. 13, 2014, for Australian Application No. 2011221652.
Australian Examination Report dated Jun. 5, 2014, for Australian Application No. 2012243484.
Australian Examination Report dated May 1, 2014, for Australian Application No. 2012300353.
Australian Examination Report dated May 14, 2014, for Australian Application No. 2012259536.
Australian first examination report pertaining to Australian patent application No. 2012304464, dated Jul. 23, 2014.
Office Action pertaining to U.S. Appl. No. 14/110,950, dated Sep. 30, 2014.
Yong, "Real-time Dynamic Path Planning for Dubins' Nonholonomic Robot", 45th IEEE Conference on Decision and Control, pp. 2418-2423, 2006.
European Search Report for Application No. 12770733.9 dated Sep. 1, 2014.
Thomson et al., "Efficient Scheduling for Multiple Automated Non-Holonomic Vehicles Using a Coordinated Path Planner", IEEE International Conference on Robotics and Automation (ICRA), pp. 1-4, May 9, 2011.
Xia, T.K. et al.; Vision Based Global Localization for Intelligent Vehicles; Intelligent Vehicles Symposium; Tokyo, Japan; Jun. 13-15, 2006; pp. 1-6.
Ibanez-Guzman, J. et al.; Unmanned Tracked Ground Vehicle for Natural Environments; no date; pp. 1-9, Dec. 2004.
U.S. Appl. No. 13/159,500, filed Jun. 14, 2011 entitled "Method and Apparatus for Sharing Map Data Associated With Automated Industrial Vehicles"; 37 pgs.
U.S. Appl. No. 13/159,501, filed Jun. 14, 2011 entitled "Method and Apparatus for Facilitating Map Data Proessing for Industrial Vehicle Navigation"; 38 pgs.
International Search Report and Written Opinion pertaining to PCT/US2012/054062 dated Nov. 27, 2012.
Written Opinion of the International Searching Authority, mailed Nov. 30, 2011 for PCT Application No. PCT/NZ2011/000025.
International Search Report and Written Opinion pertaining to International Patent Application No. PCT/NZ2011/000024 dated Dec. 7, 2011.
Azizi et al., "Mobile Robot Position Determination", Recent Advances in Mobile Robotics, Dr. Andon Topalov (Ed.), ISBN: 978-953-307-909-7, In Tech, Available from: http://www.intechopen.com/books/recent-advances-in-mobile-robotics/mobile-robot-position-determination, pp. 737-742, Dec. 2011.
Feng et al., "Model-based calibration for sensor networks", Proceedings of IEEE, vol. 2, pp. 737-742, Print ISBN: 0-7803-8133-5, Sensors, 2003.
Office Action pertaining to U.S. Appl. No. 12/948,358 dated Aug. 24, 2012.
Office Action pertaining to U.S. Appl. No. 12/948,358 dated Apr. 5, 2012.
Notice of Allowance pertaining to U.S. Appl. No. 13/300,041 dated Dec. 16, 2013.

* cited by examiner

METHOD AND APPARATUS FOR USING PRE-POSITIONED OBJECTS TO LOCALIZE AN INDUSTRIAL VEHICLE

CROSS-REFERENCE TO RELATED APPLICATIONS

The present application is filed under 35 U.S.C. 111(a) as a continuation of International Patent Application No. PCT/US2012/054062, filed Sep. 7, 2012, which international application designates the United States and claims priority to U.S. patent application Ser. No. 13/227,165, filed Sep. 7, 2011.

BACKGROUND

1. Technical Field

Embodiments of the present invention generally relate to industrial vehicle navigation systems and, more particularly, to a method and apparatus for using pre-positioned objects to localize an industrial vehicle.

2. Description of the Related Art

Entities regularly operate numerous facilities in order to meet supply and/or demand goals. For example, small to large corporations, government organizations and/or the like employ a variety of logistics management and inventory management paradigms to move objects (e.g., raw materials, goods, machines and/or the like) into a variety of physical environments (e.g., warehouses, cold rooms, factories, plants, stores and/or the like). A multinational company may build warehouses in one country to store raw materials for manufacture into goods, which are housed in a warehouse in another country for distribution into local retail markets. The warehouses must be well-organized and use floor space efficiently in order to maintain and/or improve production and sales. If raw materials are not transported to the factory at an optimal rate, fewer goods are manufactured. As a result, revenue is not generated for the unmanufactured goods to counterbalance the costs of the raw materials.

Unfortunately, physical environments, such as warehouses, have several limitations that prevent timely completion of various tasks. Warehouses and other shared use spaces, for instance, must be safe for a human work force. Some employees operate heavy machinery and industrial vehicles, such as forklifts, which have the potential to cause severe or deadly injury. Nonetheless, human beings are required to use the industrial vehicles to complete tasks, which include object handling tasks, such as moving pallets of goods to different locations within a warehouse. Most warehouses employ a large number of forklift drivers and forklifts to move objects. In order to increase productivity, these warehouses simply add more forklifts and forklift drivers.

Some warehouses utilize equipment for automating these tasks. For example, some warehouses employ automated industrial vehicles, such as automated forklifts, to carry objects on paths and then unload these objects onto designated locations. Many such warehouses offer few natural landmarks from which an automated vehicle can derive an accurate position and few have available locations on which navigational markers or beacons may be affixed. When navigating an automated industrial vehicle, it is imperative that vehicle pose computations are accurate. A vehicle pose in this context means its position and heading information, generally a pose refers to a position of an object in space with a coordinate frame having orthogonal axes of known origin and the rotations about each of those axes or a subset of such positions and rotations. If the industrial vehicle cannot determine a current pose in physical space, the industrial vehicle is unable to execute tasks. Thus automated vehicles typically employ an internal map or representation of the physical environment including the position of some navigational landmark references from which the vehicle pose may be calculated.

While using fixed infrastructure landmarks as a basis for localization or as a location to mount landmark beacons is known, using substantially pre-positioned objects or pallets as landmarks to facilitate navigation is not known. Therefore, there is a need in the art for a method and apparatus for localizing an automated industrial vehicle using dynamically placed pre-positioned objects as the majority of the landmark references.

SUMMARY

Various embodiments of the present disclosure generally comprise methods and apparatuses for using at least one movable, pre-positioned object as a landmark to localize an industrial vehicle are described. The method includes placing at least one movable, pre-positioned object within a physical environment, adding the pre-positioned object as a landmark to a map, associating observable features with the landmark from a model of the object and determining an industrial vehicle pose relative to the movable, pre-positioned object.

More specifically, according to one embodiment of the present disclosure, a method of using dynamically placed pre-positioned objects as landmarks to operate an industrial vehicle is provided. The method comprises (i) transporting an object along a path within the physical environment and placing the object at a location within the physical environment such that the placed object becomes a dynamically placed pre-positioned object in the physical environment; (ii) updating a map of the physical environment by adding placed object data representing the dynamically placed pre-positioned object to the map of the physical environment to create updated map data such that the placed object, when added to the map, serves as a landmark with observable features and can be used in the navigation of an industrial vehicle with access to the updated map data; (iii) storing the updated map data on a mobile computer attached to the industrial vehicle or on a central computer coupled to the industrial vehicle via a network; and (iv) operating the industrial vehicle based on a navigational position determined from sensor data and the updated map data by navigating the industrial vehicle along a path within the physical environment.

The pose of the dynamically placed pre-positioned object may be determined based at least in part on (i) pose prediction data stored on a central computer or a mobile computer coupled to the industrial vehicle and (ii) a location of the placed object relative to a lift carriage of the industrial vehicle. The determined pose may be used to create the updated map data and the industrial vehicle may be operated based on a navigational position that is determined by updated map data including the determined pose.

Landmarks can be created based on the placed object data and the placed object data may comprise features from the placed object, a landmark pose representing the location at which the object was placed, and/or an object pose uncertainty from the pose prediction data.

It is contemplated that a placed object may comprise a unique identifier and that a sensor on the industrial vehicle can be used to sense the unique identifier. In which case it may be advantageous to store placed object data on the central computer or the mobile computer with data representing the unique identifier.

Object pose prediction data can also be stored on the mobile computer or the central computer and the industrial vehicle may comprise a sensor for determining the location of an object to be placed relative to a lift carriage of the industrial vehicle. In which case, the pose of a placed object can be determined from the pose prediction data and the location of the object relative to the lift carriage of the industrial vehicle.

In some instances, the industrial vehicle will transition from an unpowered state to a powered state where current vehicle pose is unknown. In which case, the industrial vehicle can be subsequently operated by determining current vehicle pose from the updated map data and navigating the industrial vehicle along the path within the physical environment.

A dynamically placed pre-positioned object may comprise a known geometry. The known geometry may be defined as placed object model data that describes a set of feature information for the dynamically placed pre-positioned object and the industrial vehicle may be operated based on vehicle localization using the placed object model data. In some cases, the dynamically placed pre-positioned object comprises a pallet and items located on the pallet and the updated map data comprises a model of the pallet and the items located on the pallet. In other cases, the updated map data comprises invisible dynamic objects generated from slot locations according to parametric data derived from warehouse rack dimensions or according to a site defined storage rule for block storage areas and the method comprises updating the map to make the invisible object visible. In still further cases, placed object data representing dynamically placed pre-positioned objects serves as a landmark comprising features that are observable from more than one side of the landmark. Typically, placed object data is at least partially derived from a sensor attached to the industrial vehicle and the corresponding sensor data from which the navigational position is determined may comprise image data, laser range data, ultrasonic range data, pressure transducer data, encoder data, or combinations thereof.

In many cases, the placed object data forms a majority of landmarks comprised in the updated map data and the current vehicle pose is often determined by referring to landmark data predominantly comprising placed object data. In some embodiments, the current vehicle pose is determined by referring to landmark data consisting entirely of placed object data.

It is contemplated that the step of operating the industrial vehicle based on the navigational position determined from the sensor data and the updated map data comprises one or more automated operations executed with the assistance of a central computer or a mobile computer attached to the industrial vehicle. In which case, it is also contemplated that the automated operations are selected from a vehicle navigating operation, a vehicle status alert display, or combinations thereof.

According to another embodiment of the present disclosure, a computer is attached to the industrial vehicle or coupled to the industrial vehicle via a network. The computer comprises a navigation module for operating the industrial vehicle based on a navigational position determined from sensor data and the updated map data. The computer enables the use of dynamically placed pre-positioned objects as landmarks to operate an industrial vehicle.

The aforementioned vehicle operation may comprise one or more manual operations executed by a driver residing on the industrial vehicle, one or more automated operations executed with the assistance of a central computer or a mobile computer attached to the industrial vehicle, or combinations thereof. For example, and not by way of limitation, it is contemplated that vehicle operation may comprise vehicle navigation, which may include positioning, steering, speed control, load engagement, lifting, etc. Additionally, and not by way of limitation, it is contemplated that vehicle operation may include the display or other execution of a vehicle status alert.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
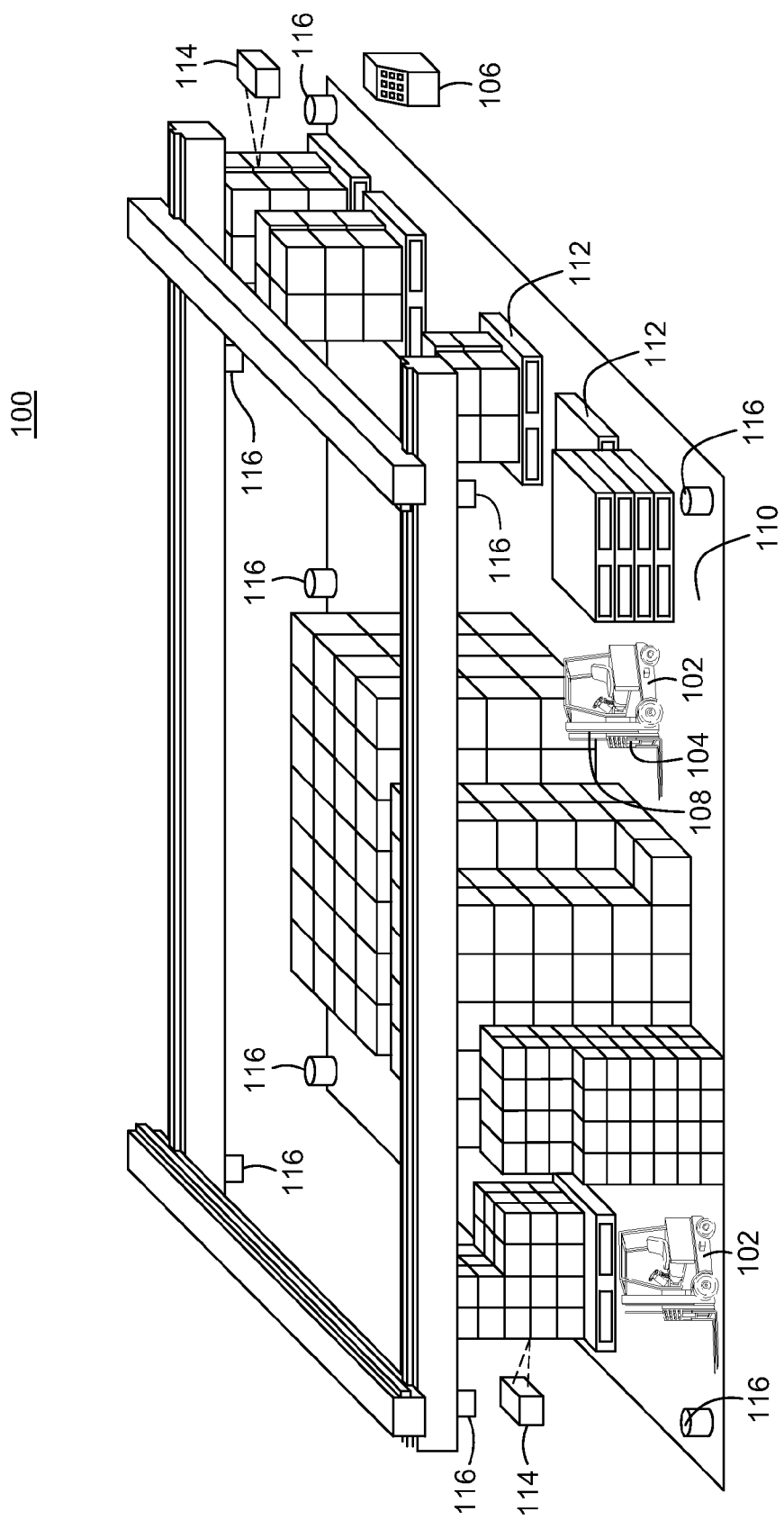
FIG. 1 is a perspective view of a physical environment comprising various embodiments of the present disclosure.

FIG. 1 illustrates a schematic, perspective view of a physical environment 100 comprising one or more embodiments of the present invention.

In some embodiments, the physical environment 100 includes a vehicle 102 that is coupled to a mobile computer 104, a central computer 106 as well as a sensor array 108. The sensor array 108 includes a plurality of devices for analyzing various objects within the physical environment 100 and transmitting data (for example, image data, video data, range map data, three-dimensional graph data and/or the like) to the mobile computer 104 and/or the central computer 106, as explained further below. The sensor array 108 includes various types of sensors, such as encoders, ultrasonic range finders, laser range finders, pressure transducers and/or the like.

The physical environment 100 further includes a floor 110 supporting a plurality of objects. The plurality of objects include a plurality of pallets 112, a plurality of units 114 and/or the like as explained further below. The physical environment 100 also includes various obstructions (not pictured) to the proper operation of the vehicle 102. Some of the plurality of objects may constitute as obstructions along various paths (e.g., pre-programmed or dynamically computed routes) if such objects disrupt task completion.

The physical environment 100 also includes a plurality of markers 116. The plurality of markers 116 are illustrated as objects attached to a floor and/or ceiling. In some embodiments, the plurality of markers 116 are landmark beacons, some of which may be unique or provide a unique configuration that facilitate vehicle localization by an environment based navigation as explained further below. The plurality of markers 116 as well as other objects around the physical environment 100 form environment landmarks with observable features by at least one sensor such as from the sensor array 108. The mobile computer 104 extracts the environment features and determines an accurate, current vehicle pose.

The physical environment 100 may include a warehouse or cold store for housing the plurality of units 114 in preparation for future transportation. Warehouses may include loading docks to load and unload the plurality of units from commercial vehicles, railways, airports and/or seaports. The plurality of units 114 generally includes various goods, products and/or raw materials and/or the like. For example, the plurality of units 114 may be consumer goods that are placed on ISO standard pallets and loaded into pallet racks or block stacked by forklifts to be distributed to retail stores. The industrial vehicle 102 facilitates such a distribution by moving the consumer goods to designated locations where commercial vehicles (e.g., trucks) load and subsequently deliver the consumer goods to one or more target destinations.

According to one or more embodiments, the vehicle 102 may be an automated guided vehicle (AGV), such as an automated forklift, which is configured to handle and/or move the plurality of units 114 about the floor 110. The vehicle 102 utilizes one or more lifting elements, such as forks, to lift one or more units 114 and then, transport these units 114 along a path to be placed at a designated location. Alternatively, the one or more units 114 may be arranged on a pallet 112 of which the vehicle 102 lifts and moves to the designated location.

Each of the plurality of pallets 112 is a transport structure that supports goods in a stable fashion while being lifted by the vehicle 102 and/or another jacking device (e.g., a pallet jack and/or a front loader). The pallet 112 is the structural foundation of an object load and permits handling and storage efficiencies. One or more parts of the plurality of pallets 112 may be utilized within a rack system (not pictured). Within one type rack system, gravity rollers or tracks allow one or more units 114 on one or more pallets 112 to flow to the front. The one or more pallets 112 move forward until slowed or stopped by a retarding device, a physical stop or another pallet 112. Other types of rack systems support pallets by interlocking the pallets with horizontal shelves providing additional stability. With this type of racking, the lowest pallet is often placed on the floor with the pallet face in front of the rack uprights thus significantly obscuring the rack uprights and rendering them unavailable as landmark references.

In many instances some areas of the physical environment 100 are designated as block storage areas, here pallets 112 are placed on the floor with other pallets stacked on top. Such block storage areas are arranged to be many pallets wide and many pallets deep and have pallets stacked high so that there are no natural landmarks or beacons 116 visible to an industrial vehicle that is deep in the row of pallets.

In some embodiments, the mobile computer 104 and the central computer 106 are computing devices that control the vehicle 102 and perform various tasks within the physical environment 100. The mobile computer 104 is adapted to couple with the vehicle 102 as illustrated. The mobile computer 104 may also receive and aggregate data (e.g., laser scanner data, image data and/or any other related sensor data) that is transmitted by the sensor array 108. Various software modules within the mobile computer 104 control operation of the vehicle 102 as explained further below.

Embodiments of this invention may make use of the location of pallets 112 placed on the physical environment 100 as landmarks to facilitate the accurate navigation of the industrial vehicle 102. In some embodiments the mobile computer 104 records the locations of pallets 112 placed in the environment and updates a map of the facility with the location of these pallets. As further explained below the mobile computer 104 uses a model of the pallet 112 and items 114 located on the pallet to create a landmark with the sensor observable navigational features of the combined load. The industrial vehicle 102 develops a position by observing the navigational features from the sensor array 108 while carrying out one or more tasks. The observed features are compared with known mapped static and/or dynamic features in a filter to determine an estimate of current vehicle pose. It should be recognized that there is a significant difference in recognizing the pallets 112 as obstacles to navigation and using the placed pallets as navigational landmarks for the accurate localization of an industrial vehicle 102 such that other pallets may be picked or placed safety in the positions required by one or more tasks.

As explained further below, the mobile computer 104 defines one or more sub-areas within the physical environment 100 for facilitating localization. The physical environment may be segmented into a plurality of sub-areas with corresponding map data stored in the plurality of sub-area maps to limit the number of landmarks to be considered for localization. Sub-area map generation is described in U.S. patent application Ser. No. 13/159,501, filed Jun. 14, 2011. The sub-area maps enhanced with pre-positioned objects may be shared between a plurality of industrial vehicles. Pre-positioned objects are objects, such as pallets and loads with known representative geometric models, which may be positioned on a map by an industrial vehicle and subsequently used as a localization reference. The sharing of map data between industrial vehicles is described in U.S. patent application Ser. No. 13/159,500, filed Jun. 14, 2011. It is appreciated that sub-area maps may comprise portions of the facility 100 in which dynamically placed pre-positioned product may be substantially the only visible landmark from which an industrial vehicle may obtain a localization reference.

Unlike fixed infrastructure, the location of pre-positioned objects is not exact but is calculated by the automated industrial vehicle that placed the object. Thus, the pose of the dynamically placed pre-positioned object may be subject to error arising from a variety of factors. The factors include, but are not limited to, uncertainty in the location of the vehicle when it places the product, uncertainty in the location of the object on the forks of the vehicle, movement of the object while it is being placed, movement of the object when other pallets 112 containing product are stacked on the object, and movement occurring from incidental contact with machinery, and the like. Thus, the mobile computer 104 must model the location of the pre-positioned object the features associated with the object and the uncertainty of the position of the object. These errors are in addition to the uncertainty associated with a sensor observation measurement of the object, thus pre-positioned objects are landmarks on the map requiring processing by the mobile computer to allow accurate localization. The mobile computer 104 navigates industrial vehicles accurately using dynamically placed pre-positioned objects as the only available landmarks.

In some embodiments, the mobile computer 104 is configured to determine a vehicle pose at start up, which requires localization with respect to a reference map without any knowledge of a previous vehicle pose. The reference map provides sufficient a-priori map data in a global coordinate system. Once the mobile computer 104 determines that a vehicle pose of the industrial vehicle 102 is unknown (e.g., when the automation system has just been started), the mobile computer 104 performs a search to determine the most likely position of the industrial vehicle 102 using one of a number of methods which include examining the environment for a unique configuration of features or purposefully placed navigation markers 116. In examining the environment, various measurements are extracted from sensor data (for example, angles, lengths, radii, and the like), and are processed to determine current observable features which are compared with known features to provide an initial vehicle pose. Based on the vehicle pose, the mobile computer 104 subsequently determines a path for completing a task within the physical environment 100.

An alternative method in accordance with embodiments of the invention involves where the mobile computer receives a position from an external source, e.g., a user interface or a low precision localization system such as that disclosed by US Patent Publ. No. 2011/0148714 A1 entitled Near Field Electromagentic Location System and Method. As an example of another alternative method, an object used as a landmark may be uniquely identifiable through the use of barcodes, RFID, specific shape, or any other unique feature that can be sensed by the sensors of an industrial vehicle and used as a reference point to remove ambiguity from the surrounding observable features being compared with known previously mapped features.

Figure 2:
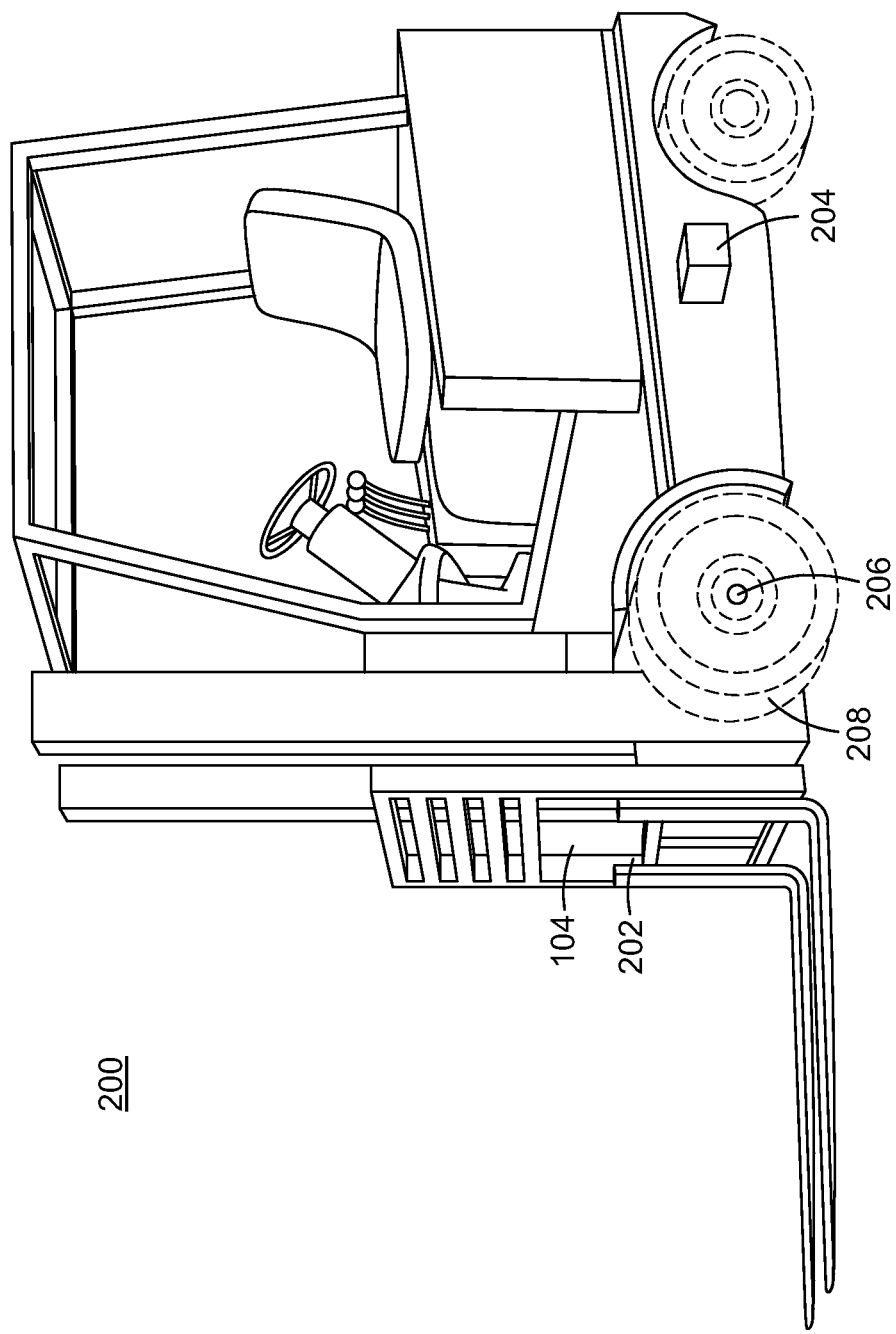
FIG. 2 illustrates a perspective view of the forklift for navigating a physical environment to perform various tasks according to one or more embodiments.

FIG. 2 illustrates a perspective view of the forklift 200 for facilitating automation of various tasks within a physical environment according to one or more embodiments of the present invention.

The forklift 200 (i.e., a lift truck, a high/low, a stacker-truck, trailer loader, sideloader, a fork hoist, and the like) is a powered industrial truck having various load capacities and used to lift and transport various objects. In some embodiments, the forklift 200 is configured to move one or more pallets (e.g., the pallets 112 of FIG. 1) of units (e.g., the units 114 of FIG. 1) along paths within the physical environment (e.g., the physical environment 100 of FIG. 1). The paths may be pre-defined or dynamically computed as tasks are received. The forklift 200 may travel inside a storage bay that is multiple pallet positions deep to place or retrieve a pallet. Oftentimes, the forklift 200 is guided into the storage bay and places the pallet on cantilevered arms or rails.

The forklift 200 typically includes two or more forks (i.e., skids or tines) for lifting and carrying units within the physical environment. Alternatively, instead of the two or more forks, the forklift 200 may include one or more metal poles (not pictured) in order to lift certain units (e.g., carpet rolls, metal coils and/or the like). In one embodiment, the forklift 200 includes hydraulics-powered, telescopic forks that permit two or more pallets to be placed behind each other without an aisle between these pallets.

The forklift 200 may further include various mechanical, hydraulic and/or electrically operated actuators according to one or more embodiments. In some embodiments, the forklift 200 includes one or more hydraulic actuator (not labeled) that permit lateral and/or rotational movement of two or more forks. In one embodiment, the forklift 200 includes a hydraulic actuator (not labeled) for moving the forks together and apart. In another embodiment, the forklift 200 includes a mechanical or hydraulic component for squeezing a unit (e.g., barrels, kegs, paper rolls and/or the like) to be transported.

The forklift 200 may be coupled with the mobile computer 104, which includes software modules for operating the forklift 200 in accordance with one or more tasks. The forklift 200 is also coupled with an array comprising various sensor devices (for example, the sensor array 108 of FIG. 1), which transmits sensor data (for example, image data, video data, range map data and/or three-dimensional graph data) to the mobile computer 104 for extracting observed features from environmental landmarks. These devices may be mounted to the forklift 200 at any exterior and/or interior position or mounted at known locations around the physical environment 100. Exemplary embodiments of the forklift 200 typically include a camera 202 and/or a two-dimensional laser scanner 204 attached to each side and/or an encoder 206 attached to each wheel 208. In other embodiments, the forklift 200 includes only the planar laser scanner 204 and the encoder 206. These encoders determine motion data related to vehicle movement. In some embodiments, a number of sensor devices (for example, laser scanners, laser range finders, encoders, pressure transducers and/or the like) as well as their position on the forklift 200 are vehicle dependent, and the position at which these sensors are mounted affects the processing of the measurement data. For example, by ensuring that all of the laser scanners are placed at a measurable position, the sensor array 108 may process the laser scan data and transpose it to a center point for the forklift 200. Furthermore, the sensor array 108 may combine multiple laser scans into a single virtual laser scan, which may be used by various software modules to control the forklift 200.

In some embodiments, sensors are mounted at fixed positions in the environment (e.g., the environment 100 of FIG. 1), referred to as external sensors, where the rich data set available from such sensors would enhance automated operations. Such external sensors may include laser scanners or cameras, and the like. External sensors may also include a limited set transponders and/or other active or passive means by which an automated vehicle could obtain an approximate position to seed a localization function.

Figure 3:
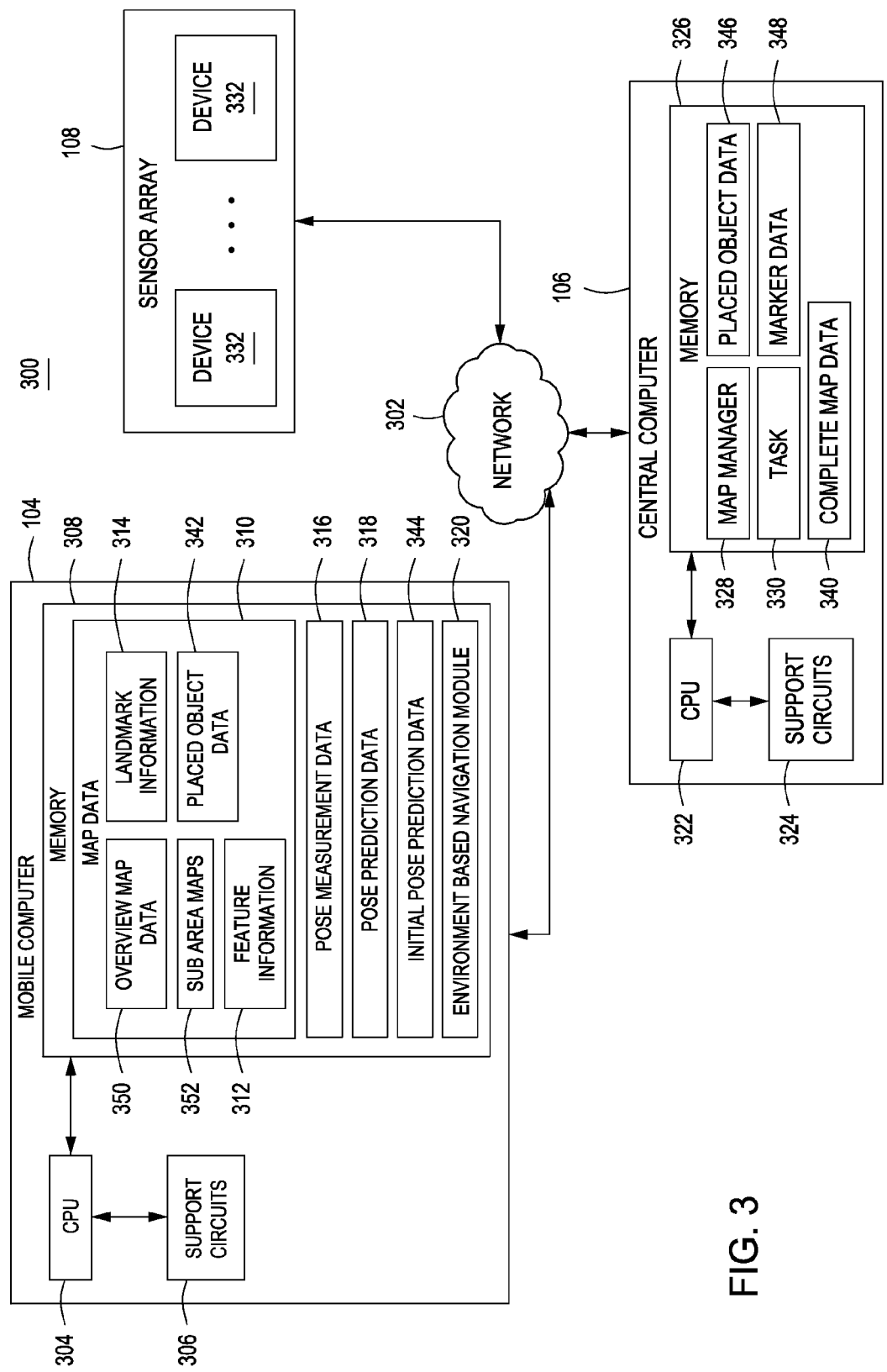
FIG. 3 is a structural block diagram of a system for using dynamically placed pre-positioned objects as landmarks to localize an industrial vehicle according to one or more embodiments.

FIG. 3 is a structural block diagram of a system 300 for providing accurate localization for an industrial vehicle according to one or more embodiments. In some embodiments, the system 300 includes the mobile computer 104, the central computer 106 and the sensor array 108 in which each component is coupled to each other through a network 302.

The mobile computer 104 is a type of computing device (e.g., a laptop, a desktop, a Personal Desk Assistant (PDA) and the like) that comprises a central processing unit (CPU) 304, various support circuits 306 and a memory 308. The CPU 304 may comprise one or more commercially available microprocessors or microcontrollers that facilitate data processing and storage. Various support circuits 306 facilitate operation of the CPU 304 and may include clock circuits, buses, power supplies, input/output circuits and/or the like. The memory 308 includes a read only memory, random access memory, disk drive storage, optical storage, removable storage, and the like. The memory 308 includes various data, such as map data 310, pose measurement data 316, and pose prediction data 318. The map data includes: sub-area maps 352, object feature information 312, landmark information 314, placed object model data 342, and an overview map 350. The memory 308 includes various software packages, such as an environment based navigation module 320.

The central computer 106 is a type of computing device (e.g., a laptop computer, a desktop computer, a Personal Desk Assistant (PDA) and the like) that comprises a central processing unit (CPU) 322; various support circuits 324 and a memory 326. The CPU 322 may comprise one or more commercially available microprocessors or microcontrollers that facilitate data processing and storage. Various support circuits 324 facilitate operation of the CPU 322 and may include clock circuits, buses, power supplies, input/output circuits and/or the like. The memory 326 includes a read only memory, random access memory, disk drive storage, optical storage, removable storage, and the like. The memory 326 includes various software packages, such as a map manager 328, as well as various data, such as a task 330, a complete map database 340, and placed object database 346.

The network 302 comprises a communication system that connects computing devices by wire, cable, fiber optic, and/or wireless links facilitated by various types of well-known network elements, such as hubs, switches, routers, and the like. The network 302 may employ various well-known protocols to communicate information amongst the network resources. For example, the network 302 may be part of the Internet or intranet using various communications infrastructure such as Ethernet, WiFi, WiMax, General Packet Radio Service (GPRS), and the like.

The sensor array 108 is communicably coupled to the mobile computer 104, which is attached to an automated vehicle, such as a forklift (e.g., the forklift 200 of FIG. 2). The sensor array 108 includes a plurality of devices 332 for monitoring a physical environment and capturing various data, which is stored by the mobile computer 104 and/or the central computer 106. In some embodiments, the sensor array 108 may include any combination of one or more laser scanners and/or one or more cameras. In some embodiments, the plurality of devices 332 may be mounted to the automated industrial vehicle. For example, a laser scanner and a camera may be attached to a lift carriage at a position above or, alternatively, below the forks.

In some embodiments, the map data 310 is partitioned into plurality of sub-area maps 352 where sub areas may overlap or may be distinct. Each sub-area map is comprised of a number of landmarks where landmarks may be static or dynamic. Landmarks may be included into the maps associated with one or more sub-areas as well as an overview map. Each landmark has associated features which are observable by one or more sensors. In some embodiments some landmarks may be associated with plurality of dynamically placed pre-positioned objects or even predominantly pre-positioned objects. The map data 310 may include a vector of known features. The feature information 312 defines features (for example, curves, lines and/or the like) associated with one or more landmarks. In some embodiments, the map data 310 indicates locations of objects (for example, dynamically placed pre-positioned objects) throughout the physical environment.

In some embodiments dynamic landmarks are associated with dynamically placed pre-positioned objects such as a pallet (e.g. the pallet 112 of FIG. 1) loaded with items (e.g. the items 114 of FIG. 1). The object has a known geometry defined as the placed object model data 342 which describes a set of feature information 312 for said object that may be used by the environment based navigation module 320 for vehicle localization. Thus when a task 330 is executed by the industrial vehicle, which results in a object being placed in the physical environment, the industrial vehicle can determine the pose of the placed object from the pose prediction data 318 and the location of the object on the forks of the industrial vehicle. The environment based navigation module 320 may then add landmark information 314 to the map data 310 creating the landmark with the features from the placed object model data 342, the landmark pose from the location at which the object was placed, and the object pose uncertainty from the pose prediction data 318. These placed objects, when added to a map 310, may then provide landmarks with observable features, which when used allows an industrial vehicle to be accurately navigated.

In some embodiments, the placed object may be uniquely identifiable through the use of barcodes, RFID, specific shape, or any other unique feature that can be sensed by the sensors of an industrial vehicle. The map data may then be updated to also include the unique attribute of the placed object. Once the object is identified, placed object data 342 may be accessed to inform the mobile computer 104 the nature of the placed object, i.e., the pose of the object. If the object data for the identified object is not locally stored as placed object data 342, the mobile computer can request the information from the central computer 106. The central computer 106 maintains the placed object database 346 and complete map 340 containing information regarding all pre-positioned objects. The pre-positioned object data 342 may be used by the environment based navigation module 320 to develop a navigational position as further described below.

In some embodiments, an industrial vehicle does not retain its position when the computer 104 is unpowered. In this case, the industrial vehicle may not know a current vehicle pose when the computer 104 is powered on. The industrial vehicle may identify one or more unique pre-positioned objects through the use of barcodes, RFID, specific shape, or any other unique feature that can be sensed by the sensors of an industrial vehicle. The unique pre-positioned object is used to seed the initial vehicle pose. The environment based navigation module may then retrieve other features from the map and use these for localization.

In some embodiments, the pose measurement data 316 includes an aggregation of data transmitted by the plurality of devices 332. Such data represents one or more observed features of objects within the environment. In one embodiment, the one or more cameras transmit image data and/or video data of the physical environment that are relative to a vehicle. In another embodiment, the one or more laser scanners (e.g., two-dimensional laser scanners) analyze objects within the physical environment and capture data relating to various physical attributes, such as size and shape. The captured data can then be compared with dimensional object models. The laser scanner creates a point cloud of geometric samples on the surface of the subject. These points can then be used to extract the observed features of the subject. The camera records image information which may be processed to extract features including lines, patterns, and color, and the like.

In some embodiments, the pose prediction data 318 includes an estimate of vehicle position and/or orientation of which the present disclosure may refer to as the vehicle pose prediction. The environment based navigation module 320 produces updated estimates using a prior vehicle pose in addition to the sensor measurements to indicate amount of movement (for example, inertial measurement unit (IMU) or odometer). The environment based navigation module 320 may also use a process filter to estimate uncertainty and/or noise for an upcoming vehicle pose prediction and update steps. Using odometry data, for example, the environment based navigation module 320 computes the distance traveled by the industrial vehicle from a prior vehicle pose, along with uncertainty of the pose given by the noise model of the odometry device. After subsequently referencing a map of the physical environment containing object landmarks with associated observable features, and comparing actual observed features from sensory data (for example, laser range sensor, camera, and the like) with the said map, the environment based navigation module 320 determines a more accurate estimate of a current vehicle pose and updates the pose uncertainty.

The environment based navigation module 320 includes processor-executable instructions for localizing the industrial vehicle 102 using unique landmarks according to some embodiments. In some embodiments, the environment based navigation module 320 may use predominantly dynamically placed pre-positioned objects to develop a current vehicle pose. The use of a process filter to develop a vehicle pose is described in U.S. patent application Ser. No. 13/116,600, filed May 26, 2011. In these embodiments, the process filter (e.g., a kalman filter or the like) can model both the uncertainty in the pose of a pre-positioned object and the uncertainty in a sensor measurement of the pre-positioned object features and develop a reliable pose prediction 318, despite the increased uncertainty. In order to use pre-positioned objects as landmarks for navigation, in one embodiment pre-positioned objects are added to and removed from the map data 310 as landmark information 314 as the vehicle executes tasks 330, such as picking or placing pallets of product, and the like. The pre-positioned object data may be shared between vehicles. In another embodiment, pre-positioned objects are added to and removed from the map data 310 in response to action external to a vehicle such as an update from a user interface, warehouse management system, factory control system and/or the like. The update changes the occupancy of a pre-defined slot to include or exclude a pre-positioned object on the map with an associated position and uncertainty.

Figure 4:
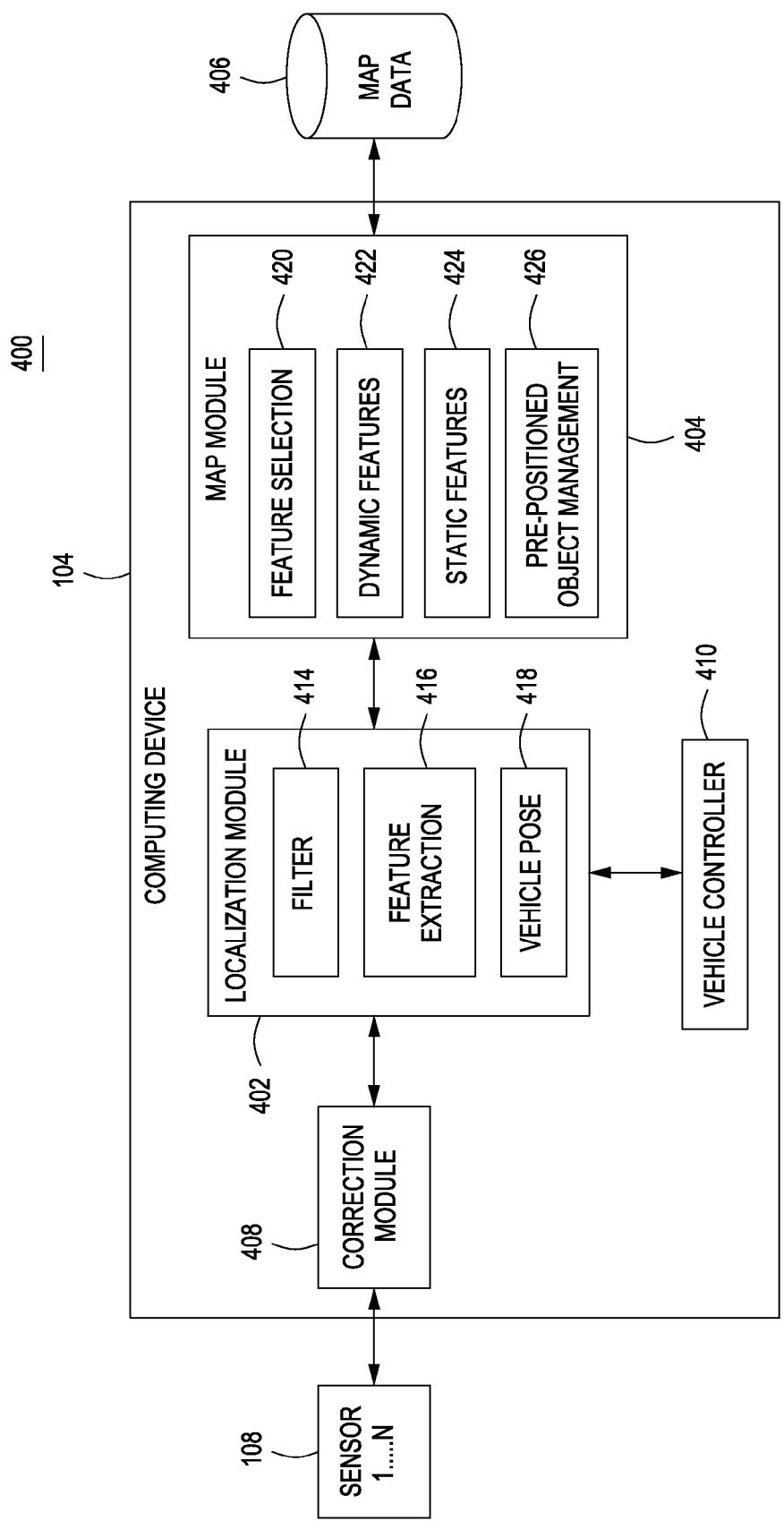
FIG. 4 is a functional block diagram of a system for providing accurate localization for an industrial vehicle according to one or more embodiments.

FIG. 4 is a functional block diagram of a system 400 for providing accurate localization for an industrial vehicle according to one or more embodiments. The system 400 includes the mobile computer 104, which couples to an industrial vehicle, such as a forklift, as well as the sensor array 108. Various software modules within the mobile computer 104 collectively form an environment-based navigation module (e.g., the environment based navigation module 320 of FIG. 3).

The mobile computer 104 includes various software modules (i.e., components) for performing navigational functions, such as a localization module 402, a mapping module 404, a correction module 408, and a vehicle controller 410. The mobile computer 104 provides accurate localization for the industrial vehicle and updates map data 406 with dynamically placed pre-positioned object landmarks. The localization module 402 may also include various components, such as a filter 414 and a feature extraction module 416. The map module 404 may include various data, such as static features 424 (such as features that do not change on the map, such as features created by walls and fixed racking, and the like) and dynamic features 422 (features that may change on the map, such as features created by placing pallets or pre-positioned objects on the map, and the like). The map module 404 may also include various components, such as a feature selection module 420 and pre-positioned object management 426.

In some embodiments, the localization module 402 processes corrected sensor data from the correction module and operates on this data to estimate a vehicle pose. The filter 414 updates the vehicle pose prediction to account for an incorrect estimation and/or observation uncertainty. The filter 414 determines the vehicle pose 418 and may instruct the mapping module 404 to update the map data 406. The vehicle pose 418, which is modeled by the filter 414, refers to a current vehicle position and orientation. The localization module 402 communicates data associated with the vehicle pose 418 to the mapping module 404 while also communicating such data to the vehicle controller 410. Based on the vehicle pose, the vehicle controller 410 navigates the industrial vehicle to a destination.

In addition to the filter 414 for calculating the vehicle pose 418, the localization module 402 also includes the feature extraction module 416 for extracting known standard features from the corrected sensor data. The filter 414 compares the extracted features with the dynamic features 422 and static features in the map module 404 to determine a vehicle pose.

The localization module 414 may use the vehicle pose 418 and the mapping module 404 to reduce a number of features to examine by eliminating invisible features or features at a defined distance from the current vehicle position. The feature selection module 420 manages addition and modification of the dynamic features 422 to the map data 406. Some of these objects are dynamically placed pre-positioned objects for which the pre-positioned object management module is involved. When the industrial vehicle is executing a task to place a product in the warehouse (e.g., the environment 100 of FIG. 1), the vehicle controller 410 will communicate with the localization module 402 to indicate that a new dynamically placed object is to be created on the map. Information provided to the localization module 402 will include the pose of the object relative to the vehicle center and the uncertainty in that measurement and may include the unique object identity. The localization module 402 will examine the current vehicle pose and uncertainty (for example, the pose prediction data 318 of FIG. 3) and will request that the pre-positioned object management module 426 add one or more new features to the map. The pre-positioned object management module 426 will calculate the pose of the object and the pose uncertainty of the object and will create a landmark (for example, the landmark information 314 of FIG. 3) and a reference set of features 422 for the object by referencing a model of the placed object (for example, the placed object data 342 of FIG. 3).

It is appreciated that the system 400 may employ several computing devices to perform environment based navigation. Any of the software modules within the computing device 104 may be deployed on different or multiple physical hardware components, such as other computing devices. The mapping module 404, for instance, may be executed on a server computer (for example, the central computer 102 of FIG. 1) over a network (for example, the network 302 of FIG. 3) to connect with multiple mobile computing devices for the purpose of sharing and updating the map data 406 with a current vehicle pose.

In some embodiments, the correction module 408 processes sensor input messages from disparate data sources, such as the sensor array 108, having different sample/publish rates as well as different (internal) system delays. The correction module 408 examines each message separately in order to preserve the consistency of each observation. Such an examination may be performed in place of fusing the sensor data to avoid any dead reckoning errors. Notice that with different sampling periods and different system delays, the order at which the sensor data is acquired is not the same as the order at which the sensor input messages eventually became available to the computing device 104.

Figure 5:
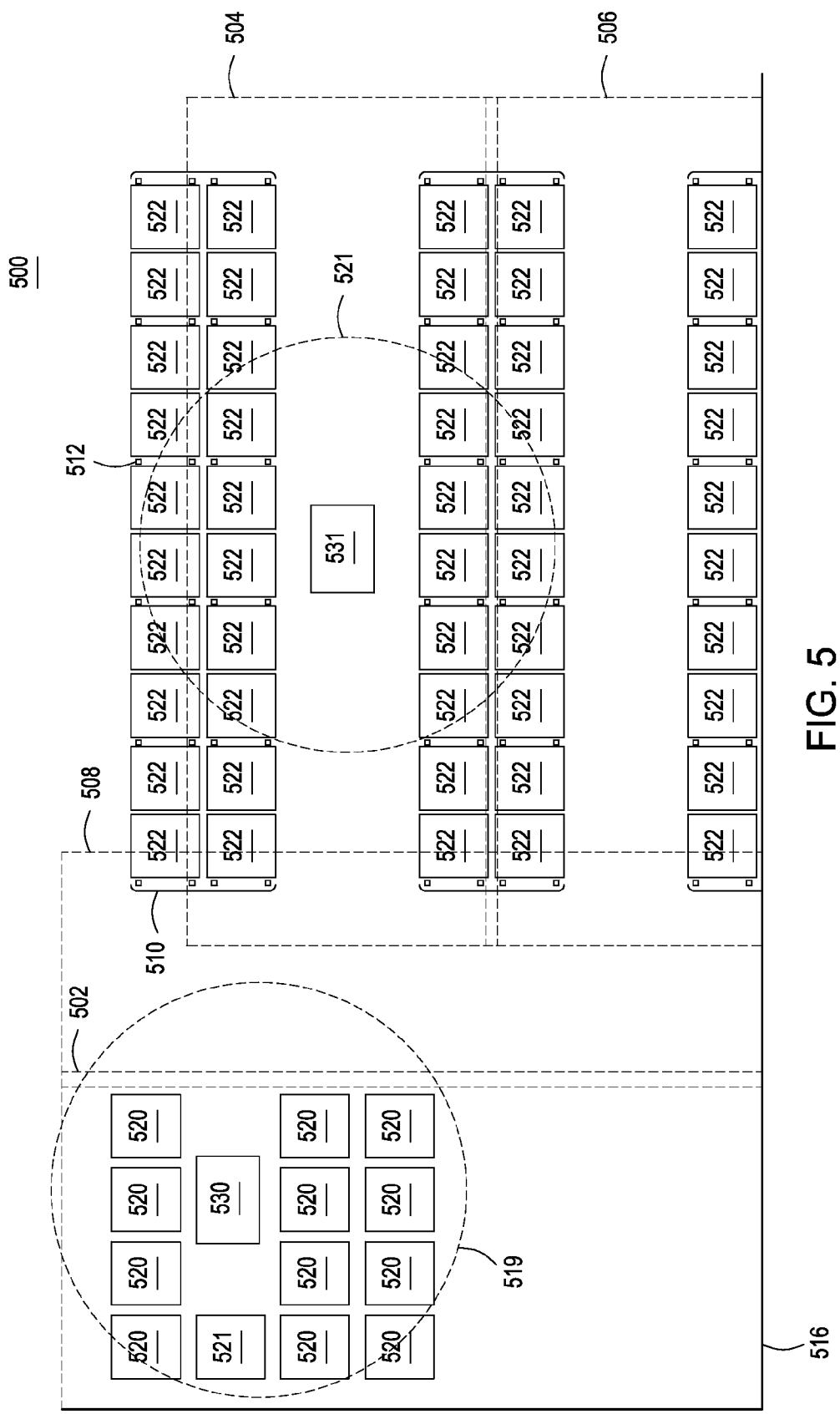
FIG. 5 is a schematic illustration of a map for a physical environment comprising dynamically placed pre-positioned objects as landmarks according to one or more embodiments.

FIG. 5 is a schematic illustration of an environment map 500 for a physical environment including a plurality of dynamically placed pre-positioned objects forming the majority of available landmarks according to one or more embodiments of the invention. The map 500 is partitioned into a sub-area 502, a sub-area 504, a sub-area 506, and a sub-area 508. Sub-area maps may overlap or be non-contiguous. The map 500 depicts both static landmarks such as the wall 516, the navigation beacon 514, racking protectors 510 as well as the racking 512. The map 500 also depicts a plurality of pre-positioned dynamic objects including the objects 522 currently invisible to the industrial vehicle 530 which may be of the same type as vehicle 102 in FIG. 1, as they are either outside the current sub-map 502 or outside the sensor range 519. The map 500 also depicts the dynamically placed pre-positioned objects 520 visible to the industrial vehicle 530. The industrial vehicle 530 is located in the position shown with sensor range 519 and is carrying object 521.

The industrial vehicle 530 is dependent on the dynamically placed pre-positioned objects 520 to develop a pose that will allow it to place the product 521 in the position specified by the current task (for example, the task 330 of FIG. 3) as no static features that are currently visible (such as the racking legs 512) pre-positioned objects 520 are used to provide an accurate localization pose. Once the industrial vehicle 530 completes placing the product 521, this product may be added to the map as a new dynamically placed pre-positioned object as described above. Once the placed object 521 is added to the map with associated features and uncertainty it may be used for localization. The pre-positioned object model information together with its pose provides observable features from all sides of the object, thus the object may be used as a navigational reference from directions which have not previously been observed. An industrial vehicle 530 or a second industrial vehicle may remove a pre-positioned object from the global map. Once the pre-positioned object is removed from the global map, the individual vehicles local maps may be updated and the pre-positioned object is not longer used as a navigational reference.

A second industrial vehicle 531, which may be of the same type as vehicle 102 in FIG. 1, may be dependent on the dynamically placed pre-positioned objects 522 and static landmarks 512 to develop a pose. Objects 522 are placed in slots, which is a description of the approximate location of a pallet 112 which may hold a plurality of units 114. Pre-positioned objects may be placed into or removed from the slot by an automated industrial vehicle, a manual industrial vehicle, a convey system, or the like. In the event that the occupancy slot becomes occupied, a pre-positioned object is created on the map. The map data is provided to the industrial vehicle to be used as a navigational reference with an associated uncertainty. Similarly, if a slot becomes empty, the pre-positioned object is removed from the map. The map data is provided to the vehicle and the pre-positioned object of the individual slot is removed from the map as a navigational reference.

Figure 6:
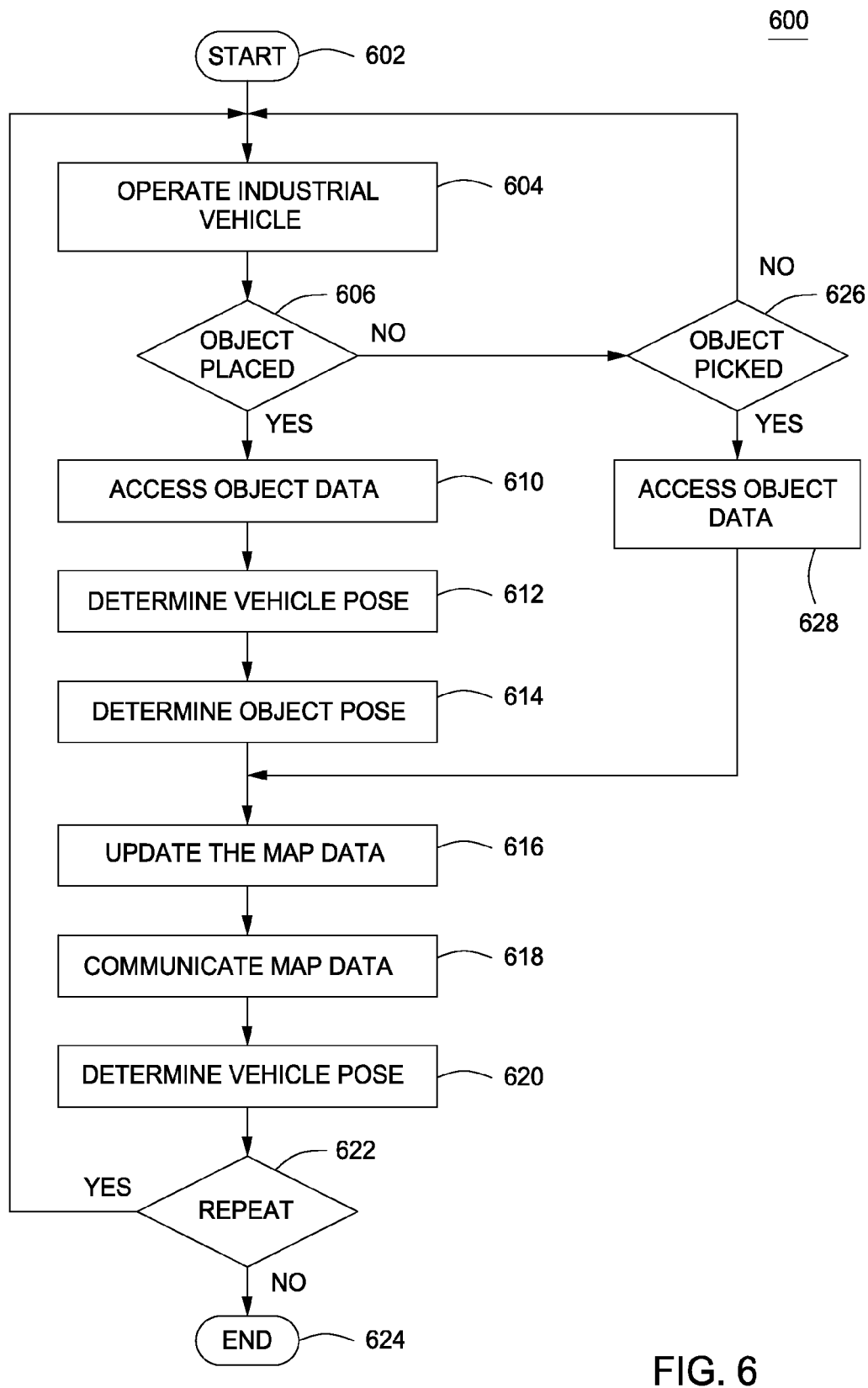
FIG. 6 is a flow diagram of a method of designating a pre-positioned object as a unique landmark for facilitating localization according to one or more embodiments.

FIG. 6 is a flow diagram of a method 600 for designating a pre-positioned object as a unique landmark for facilitating localization according to one or more embodiments. In some embodiments, the method may include placing an object in the environment, designating said object as a dynamically placed pre-positioned object, storing the location of said object as a landmark on a map, and using said landmarks to navigate an industrial vehicle. The method includes identifying at least one dynamically placed object within a physical environment, wherein the dynamically placed object corresponds with a mapped area of the physical environment, and determining industrial vehicle pose by an environment base navigation module in response to matching feature information from the vehicle's sensors that correspond to the features of at least one dynamically placed object. In some embodiments, an environment based navigation module (e.g., the environment based navigation module 320 of FIG. 3) may perform each step of the method 600.

In some embodiments, some steps may be omitted or performed by other modules. The environment based navigation module is stored within a mobile computer (e.g., the mobile computer 104 of FIG. 1) that is operably coupled to an industrial vehicle (e.g., the industrial vehicle 102 of FIG. 1). A central computer (e.g., the central computer 106 of FIG. 1) includes a map manager (e.g., the map manager 328 of FIG. 3) for communicating with the industrial vehicle as well as one or more second industrial vehicles. When performing a task (e.g., the task 330 of FIG. 3), a task manager communicates instructions for executing the task. For example, the manager may instruct the environment based navigation module to navigate the industrial vehicle along a particular path while carrying an object (e.g., a pallet 112 containing items 114 of FIG. 1) to be placed in the environment. Turning to FIG. 6, the method 600 starts at step 602 and proceeds to step 604.

At step 604, the method 600 operates the industrial vehicle according to one or more tasks. In some embodiments, the method 600 localizes and navigates the industrial vehicle about the physical environment while completing tasks. Some tasks require the industrial vehicle to load and unload objects, such as product items (e.g., the plurality of units 114 of FIG. 1) or pallets (e.g., the plurality of pallets 112 of FIG. 1), at assigned locations that are referred to as slots. As explained further below, an object, once unloaded, may be designated a unique landmark for the purpose of facilitating localization.

At step 606, the method 600 determines whether the current task involves placing an object and whether that objects is to be considered a pre-positioned object to be added to map data. If there is a pre-positioned object the method 600 proceeds to step 610. If, on the other hand, there is no pre-positioned object to add to the map data, the method 600 proceeds back to the start. At step 610, the method 600 uses the model information to select the appropriate feature information (e.g., the object feature information 312 of FIG. 3) associated with the pre-positioned object that is being placed. In any environment, there are many objects to be handled by an industrial vehicle and each type of object may have different feature information. Furthermore, while the industrial vehicle is placing the object, the sensor(s) have a limited view of the object, however the map may contain a complete description of the object so that another industrial vehicle approaching the pre-positioned object from a different direction can identify the sensor object as the current pre-positioned object.

At step 614, the method 600 determines the object pose and uncertainty relative to the vehicle's current pose and uncertainty. In some embodiments, the pose of the object will be measured using vehicle sensors (e.g., the sensor array 108 of FIG. 1). This sensor measurement will be subject to a sensor data uncertainty and commissioned sensor position on the vehicle uncertainty that are characteristic to the sensor and mounting mechanism. In other embodiments, an object may be accurately positioned on a vehicle attachment, e.g., by clamps or on the forks, and a commissioned measurement of the attachment pose relative to the vehicle origin may be used.

At step 616, the method 600 updates the map data (e.g., the map data 310 of FIG. 3) with the pre-positioned object landmark and feature information. The new dynamic landmark (e.g., the landmark information 314 of FIG. 3) will be generated in the map and the landmark will include dynamic features (e.g., the object feature information 312 of FIG. 3) observable from one or more sides of the new landmark. The new landmark pose will be relative to the vehicle pose in a global reference frame and translated to the landmark center according to the placed object model (e.g., the placed object data 342 of FIG. 3). In other embodiments, the map may already include invisible dynamic objects generated from slot locations according to parametric data derived from the rack dimensions or according to a site defined storage rule for block storage areas and updating the map involves making the invisible object visible and indicating an uncertainty associated with the position of the real object relative to the generated pose.

At step 618, the method 600 communicates the updated map data to, for example, one or more second industrial vehicles. At step 620, the method 600 determines a vehicle pose using the updated map data. The method 600 proceeds to step 624. At step 624, the method 600 ends.

It is appreciated that method 600 can also be used to remove a pre-positioned object landmark from the map. At step 626 the method determines if the task involves picking an object. If so, the method accesses the object data at step 628, removes the pre-positioned object, and updates the map at step 616. The update map is then communicated to the vehicles at step 618.

While the foregoing is directed to embodiments of the present invention, other and further embodiments of the invention may be devised without departing from the basic scope thereof, and the scope thereof is determined by the claims that follow.

The invention claimed is:

1. A method of using dynamically placed pre-positioned objects as landmarks to operate an industrial vehicle, the method comprising:
   transporting an object along a path within a physical environment and placing the object at a location within the physical environment such that the placed object becomes a dynamically placed pre-positioned object in the physical environment;
   determining a pose of the dynamically placed pre-positioned object based at least in part on (i) vehicle pose prediction data stored on a central computer or a mobile computer coupled to the industrial vehicle and (ii) a location of the placed object relative to a lift carriage of the industrial vehicle;
   updating a map of the physical environment by using the determined pose and adding placed object data representing the dynamically placed pre-positioned object to the map of the physical environment to create updated map data such that the placed object, when added to the map, serves as a landmark with observable features and can be used in navigation of an industrial vehicle with access to the updated map data;
   storing the updated map data on a mobile computer attached to the industrial vehicle or on a central computer coupled to the industrial vehicle via a network; and
   operating the industrial vehicle based on a navigational position determined from sensor data and the updated map data by navigating the industrial vehicle along a path within the physical environment.

2. The method of claim 1 further comprising:
   creating a landmark based at least in part on the placed object data, wherein the placed object data comprises features from the placed object, a landmark pose representing the location at which the object was placed, and an object pose uncertainty from the vehicle pose prediction data;
   adding the landmark to the updated map data; and
   operating the industrial vehicle based on a navigational position determined from updated map data including the landmark.

3. The method of claim 2 wherein:
   the placed object comprises a unique identifier; and
   the method comprises utilizing a sensor on the industrial vehicle to sense the unique identifier.

4. The method of claim 3 wherein the placed object data is stored on the central computer or the mobile computer with data representing the unique identifier.

5. The method of claim 1 wherein:
   object pose prediction data is stored on the mobile computer or the central computer; and
   the industrial vehicle comprises a sensor for determining the location of an object to be placed relative to a lift carriage of the industrial vehicle.

6. The method of claim 1 wherein the object is transported and placed using an industrial vehicle, an automated industrial vehicle, or a conveyer system.

7. The method of claim 1 wherein:
   operation of the industrial vehicle comprises a transition from an unpowered state to a powered state where current vehicle pose is unknown; and
   the industrial vehicle is subsequently operated by determining current vehicle pose from the updated map data and navigating the industrial vehicle along the path within the physical environment.

8. The method of claim 1 wherein the dynamically placed pre-positioned object comprises a pallet loaded with items.

9. The method of claim 1 wherein the dynamically placed pre-positioned object has a known geometry, and the method comprises:
   defining the known geometry as placed object model data that describes a set of feature information for the dynamically placed pre-positioned object; and
   operating the industrial vehicle based on vehicle localization using the placed object model data.

10. The method of claim 9 wherein:
    the dynamically placed pre-positioned object comprises a pallet and items located on the pallet; and
    the updated map data comprises a model of the pallet and the items located on the pallet.

11. The method of claim 1, wherein:
    the updated map data comprises invisible dynamic objects generated from slot locations according to parametric data derived from warehouse rack dimensions or according to a site defined storage rule for block storage areas; and
    the method comprises updating the map to make the invisible object visible.

12. The method of claim 1 wherein the placed object data representing the dynamically placed pre-positioned object serves as a landmark comprising features that are observable from more than one side of the landmark.

13. The method of claim 1 wherein the placed object data is at least partially derived from a sensor attached to the industrial vehicle.

14. The method of claim 1 wherein the sensor data from which the navigational position is determined comprises image data, laser range data, ultrasonic range data, pressure transducer data, encoder data, or combinations thereof.

15. The method of claim 1 wherein the placed object data forms a majority of landmarks comprised in the updated map data.

16. The method of claim 1 wherein the current vehicle pose is determined by referring to landmark data predominantly comprising placed object data.

17. The method of claim 1 wherein the current vehicle pose is determined by referring to landmark data consisting entirely of placed object data.

18. The method of claim 1 wherein:
    the step of operating the industrial vehicle based on the navigational position determined from the sensor data and the updated map data comprises one or more automated operations executed with the assistance of a central computer or a mobile computer attached to the industrial vehicle; and the automated operations are selected from a vehicle navigating operation, a vehicle status alert display, or combinations thereof.

19. A computer attached to an industrial vehicle or coupled to an industrial vehicle via a network, the computer comprising a navigation module for operating the industrial vehicle based on a navigational position determined from sensor data and updated map data, wherein the computer enables the use of dynamically placed pre-positioned objects as landmarks to operate an industrial vehicle according to the method of claim 1.

* * * * *

UNITED STATES PATENT AND TRADEMARK OFFICE
CERTIFICATE OF CORRECTION

PATENT NO.          : 9,056,754 B2                                    Page 1 of 1
APPLICATION NO.     : 13/672391
DATED               : June 16, 2015
INVENTOR(S)         : Lisa Wong et al.

It is certified that error appears in the above-identified patent and that said Letters Patent is hereby corrected as shown below:

In the Specification

Col. 6, Line 20,
  "placed safety in the positions required by one or more tasks." should read
  --placed safely in the positions required by one or more tasks.--; and Col. 14, Line 23,
  "rent task involves placing an object and whether that objects" should read
  --rent task involves placing an object and whether that object--.

Signed and Sealed this
Twenty-ninth Day of March, 2016

Michelle K. Lee
*Director of the United States Patent and Trademark Office*